United States Patent [19]
Müller

[11] Patent Number: 5,465,252
[45] Date of Patent: Nov. 7, 1995

[54] METHOD FOR RECEIVING AND DELIVERING SECTION OVERHEADS OF AND FOR STM-1 SIGNALS IN A SECTION-OVERHEAD SERVER OF A NETWORK NODE

[75] Inventor: Horst Müller, Hohenschäftlarn, Germany

[73] Assignee: Siemens Aktiengesellschaft, Munich, Germany

[21] Appl. No.: 104,162

[22] PCT Filed: Feb. 5, 1992

[86] PCT No.: PCT/DE92/00072

§ 371 Date: Aug. 11, 1993

§ 102(e) Date: Aug. 11, 1993

[87] PCT Pub. No.: WO92/14315

PCT Pub. Date: Aug. 20, 1992

[30] Foreign Application Priority Data

Feb. 12, 1991 [DE] Germany .......................... 41 04 238.7

[51] Int. Cl.[6] ..................................................... H04J 3/12
[52] U.S. Cl. ..................... 370/65.5; 370/68.1; 370/112; 370/110.1
[58] Field of Search ......................... 370/94.1, 60, 60.1, 370/110.1, 112, 84, 102, 105.1, 58.1, 58.2, 65.5, 79, 68.1

[56] References Cited

U.S. PATENT DOCUMENTS

| | | | |
|---|---|---|---|
| 5,123,010 | 6/1992 | Pospischil | 370/58.1 |
| 5,144,297 | 9/1992 | Ohara | 370/84 |
| 5,168,494 | 12/1992 | Mueller | 370/84 |
| 5,195,088 | 3/1993 | Urbansky | 370/84 |
| 5,210,745 | 5/1993 | Guinaud et al. | 370/79 |
| 5,214,643 | 5/1993 | Mueller et al. | 370/84 |
| 5,265,095 | 11/1993 | Fiedler et al. | 370/94.1 |
| 5,267,239 | 11/1993 | Pospischil et al. | 370/112 |
| 5,315,594 | 5/1994 | Noser | 370/110.1 |

FOREIGN PATENT DOCUMENTS

| | | |
|---|---|---|
| 58972/90 | 1/1991 | Australia . |
| 61974/90 | 3/1991 | Australia . |
| 0407851 | 1/1991 | European Pat. Off. . |
| 87713 | 7/1990 | France . |

OTHER PUBLICATIONS

"Network Node NK2000–A Controllable Mulitplexing and Distribution Facility for Transmission Networks", British Telecommunications Engineering, vol. 9, Aug. 1990, pp. 60–63.
CCITT, Recommendations—G.708, pp. 114–121, Nov. 1988.
CCITT, Recommendations—G.709, pp. 1 and 21, Jun. 1990.
Netzknoten NK 2000, Aug. 1990.

*Primary Examiner*—Douglas W. Olms
*Assistant Examiner*—Chau T. Nguyen
*Attorney, Agent, or Firm*—Hill, Steadman & Simpson

[57] ABSTRACT

In a cross-connect multiplexer (CCM2), a plurality of interface units, among others those (AE1) for STM-1 signals of the synchronous digital hierarchy (SDH), are connected to a space-division switching network (RKF). The section overheads of these synchronous transport modules (STM-1) overall are partly received and analyzed and partly multiplexed and sent out in a section overhead server (SOHS) with the assistance of a network control unit (NCU). This process is simplified by STM-1 signals being converted into a plurality of D39 signals, known per se, of a bit rate of 38,912 Mbit/s, and conversely, only bytes necessary for transmission of the section overheads being inserted into only one of the sixteen frame columns of a D39 signal belonging to the STM-1 signal via the space-division switching network (RKF). It is only these special columns of in each case sixteen STM-1 signals which are combined to form a separate D39 signal which is received or transmitted by the section overhead server (SOHS). Such cross-connect multiplexers (CCM2) are used in network nodes of digital networks.

2 Claims, 6 Drawing Sheets

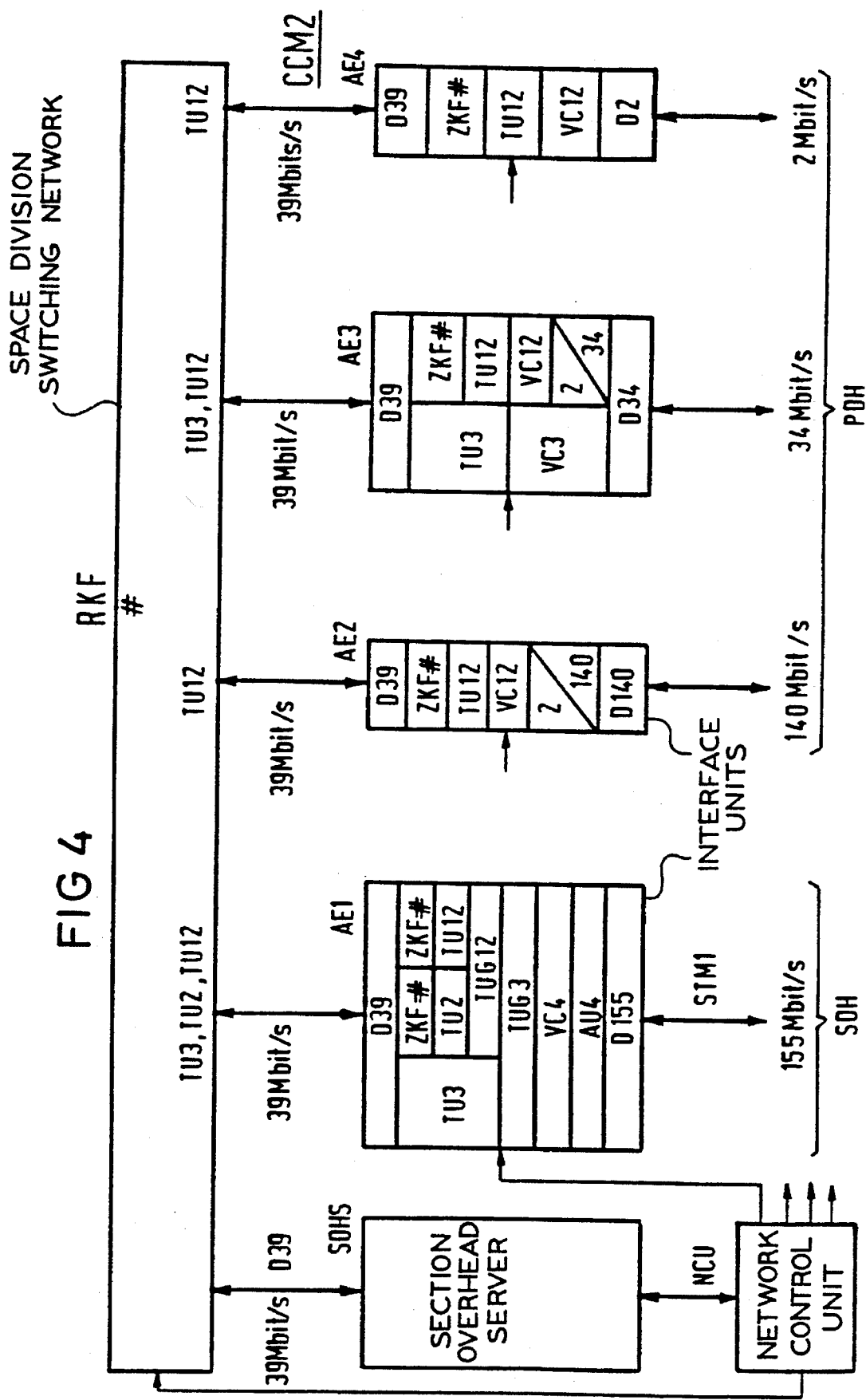

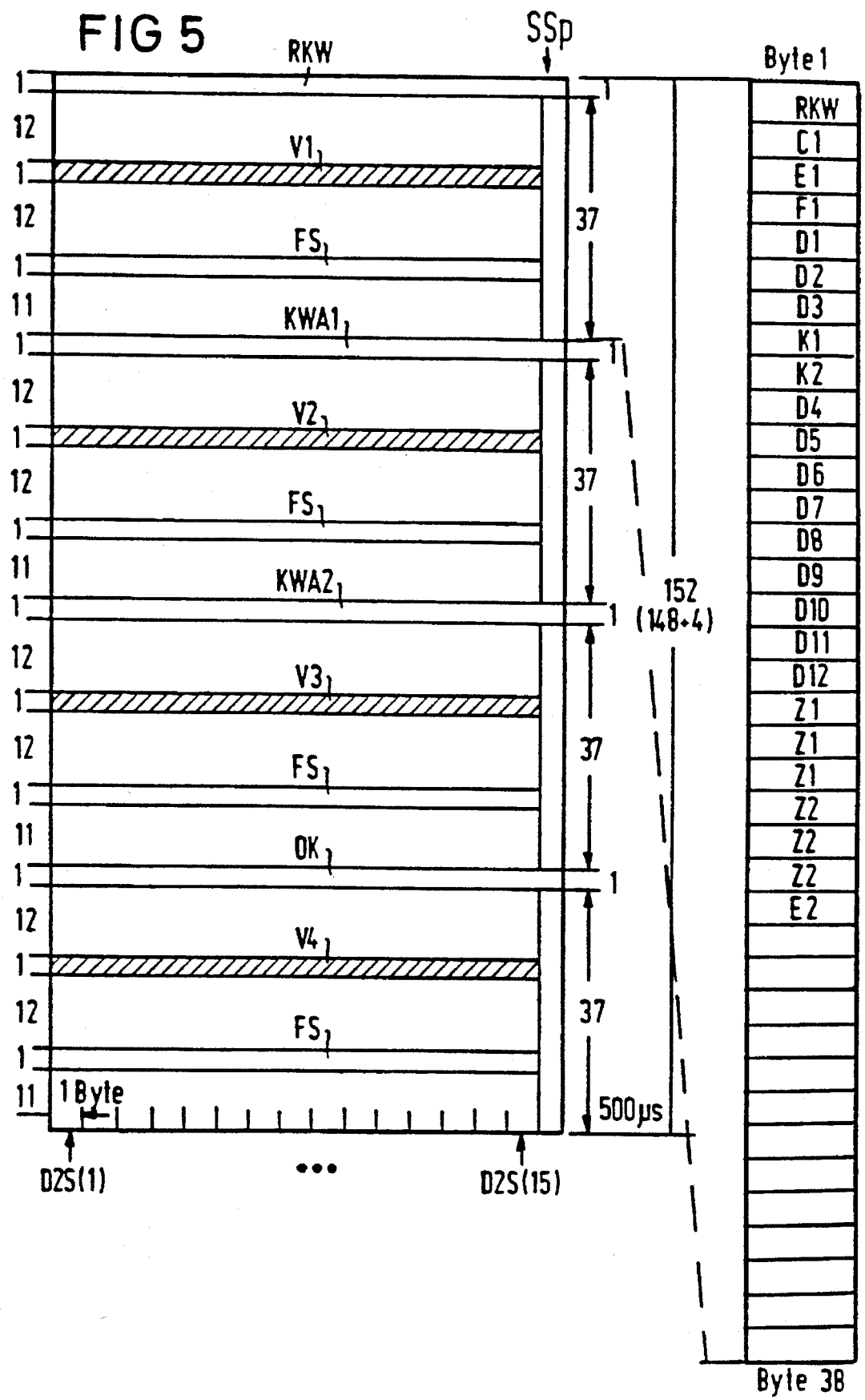

METHOD FOR RECEIVING AND DELIVERING SECTION OVERHEADS OF AND FOR STM-1 SIGNALS IN A SECTION-OVERHEAD SERVER OF A NETWORK NODE

BACKGROUND OF THE INVENTION

1. Field of the Invention

Digital transmission systems contain network nodes, controlled by a network management system, with interfaces for digital signals of the plesiochronous digital hierarchy PDH and for STM-1 signals of the synchronous digital hierarchy SDH.

2. Description of the Related Art

FIG. 1 shows a multiplex structure of the European Telecommunications Standards Institute ETSI, Recommendation ETS DE/TM-301, version 1.2 of 30.06.1990. In this structure, AU means administrative unit, C is container, STM is synchronous transport module, TU is tributary unit, TUG is tributary unit group and VC is virtual container. The numbers on the lines specify how often a similar unit per transport module STM-1 to be formed is transmitted. The arrows indicate the direction of transmission during multiplexing; the signal flow is reversed during demultiplexing. The tributary unit TU-11 is shown dashed because it originates from a multiplex structure according to FIG. 1.1 of CCITT Recommendation G.709 of 6.6.1990.

In the printed Siemens document "NK2000 Network Node", issued by the Transmission Systems Department, POB 70 00 71, D-W-8000 Munich, order No. S42022-D4200-A1-3-29, a network node is described which contains a network control unit NCU and various switching devices connected to it and to one another by means of buses.

A CCM64K switching device is a cross-connect multiplexing device with a switching network for non-blocking routing of 64-kbit/s signals and with interfaces for 2-Mbit/s signals.

A CCM2 switching device is a cross-connect multiplexing device which contains a multi-stage synchronous switching network. It provides for non-blocking routing at various switching levels of the synchronous digital hierarchy SDH. These are the switching level TU-12 for s-Mbit/s signals and the switching level TU-3 for 34- and 45-Mbit/s signals.

A CC155 switching device is a cross-connect device with a synchronous switching network for non-blocking routing of 140-Mbit/s signals and STM-1 signals of a bit rate of 155 Mbit/s at the AU-4 switching level.

A network node concept DBPT of the firms ANT Nachrichtentechnik GmbH and Standard Elektrik Lorenz AG contains a switching device, corresponding to the CCM2 switching device, with an OH server controlled by the network control unit, which receives the section overheads of all incoming STM-1 signals and generates corresponding section overheads for the STM-1 signals to be output.

FIG. 2 shows the frame of a synchronous transport module STM-1 with 270 columns SP or bytes and 9 rows R. This form was chosen in order to be able to represent the frame with a length of 9 * 270 Sp on one DIN-A4 sheet. For system-internal purposes, the frame contains a regenerator section overhead RSOH, a multiplexer section overhead MSOH and an administrative unit pointer AU PTR.

FIG. 3 shows the section overhead of the STM-1 frame according to FIG. 2 with a byte allocation according to FIG. 5.2 of CCITT Recommendation G.708 of June 1990. The supplementary bytes of the RSOH and MSOH section overheads are used, for example, for synchronising to the beginning of the frame (A1, A2), for determining the bit error rate of the regenerator section (B1) and of the multiplex section (B2), for identifying the STM-1 signal (C1), for transmitting control information items (D1–D12), as engineer's order channel (E1, E2), for automatic stand-by switching (K1, K2) or as spare (Z1, Z2). The F1 byte is available to the user. These supplementary bytes are distributed over seven columns Sp of the frame.

From European Patent Application EP-0,407,851 A2, a process for switching multiplex signals through via a cross-connect device is known in which data, arranged in data blocks, of the plesiochronous or synchronous digital hierarchy of various multiplexing levels are converted into uniform cross-connect data blocks. These have a bit rate of 38.912 Mbit/s, are accommodated in frames in 152 rows and 16 columns and are designated as D39 signals. Their circuit implementation is described in a prior proposal (P 39 30 007.2).

According to FIG. 1, up to sixty three 1.5- or 2-Mbit/s signals, three 34- or 45-Mbit/s signals or one 140-Mbit/s signal can be multiplexed into one STM-1 signal via the tributary units TU-12. Such a signal is divided into four D39 signals in the receiving section of an interface unit of the CCM2 switching device and are supplied to the space-division switching matrix after a time-division switching stage in which the up to sixteen TU-12 or D2/S signals contained in a D39 signal can be arbitrarily distributed in time. For this space-division switching matrix, the number of D39 signals must be doubled between the time-division and space-division switching network, that is to say eight D39 signals must be provided in the CCM2 switching device. Since sixty four TU-12 signals can be transmitted in the four D39 signals, one column is not occupied.

When the tributary unit TU-11 according to FIG. 1 is used, the multiplexing structure shows that, instead of sixty three 1.5-Mbit/s signals, eighty four of those signals are multiplexed for the US hierarchy. After doubling, this requires twelve D39 signals.

If 34-, 45- or 140-Mbit/s signal bursts are conducted via the space-division switching network, the time-division switching function and thus the doubling of the D39 signals is omitted for these so that more free capacity is available for the transmission of the supplementary bytes in these cases.

Processing of a complete RSOH and MSOH section overhead requires considerable effort which must be carried out for each STM-1 signal in a CCM2 cross-connect device.

SUMMARY OF THE INVENTION

The invention is based on the problem of simplifying the processing of this section overhead, and provides a method for receiving section overheads from all incoming STM-1 signals and for outputing section overheads to all outgoing STM-1 signals in a switching device comprising a section overhead server, connected to a space-division switching network with STM-1 interface units and to a processor, in a network node of a digital information transmission system, wherein in the receiving section of each STM-1 interface unit, an STM-1 signal is converted into four D39 signals having in each case one byte frame consisting of 152 rows and 16 columns, in that the bytes occupied for special purposes of the section overheads, with the exception of the frame synchronization bytes and the bytes for determining the bit error rate from the section overhead are inserted into an unoccupied column of the frame of one of these D39 signals, in that only the bytes of this one column are supplied to the section overhead server via the space-division switching network for each incoming STM-1 signal, in that, furthermore, a column for a D39 frame with the occupied bytes of the section overheads, with the exception of the frame synchronization bytes and the bytes for determining the bit error rate, is generated for one of the four D39 signals of each outgoing STM-1 signal in the section overhead server, in that this column is inserted into an unoccupied column of one of the four D39 signals supplied to the transmitting section of the STM-1 interface unit via the space-division switching network, and in that the four D39 signals are converted into a outgoing STM-1 signal.

The advantages achieved by means of the invention consist in that lower-bit rate D39 signals can be used in the space-division switching network and that the section overhead server only needs to evaluate or generate one frame column instead of seven for each STM-1 signal.

Bytes A1, A2, B1 and B2 of the RSOH and MSOH section overhead are directly processed in STM-1 interface units since these functions are associated with the STM-1 signal and must be processed in real-time mode.

BRIEF DESCRIPTION OF DRAWINGS

An illustrative embodiment of the invention is described in greater detail in the text which follows and is shown in the drawing, in which:

FIG. 4 shows a CCM2 switching device,

FIG. 5 shows a D39 frame,

DETAILED DESCRIPTION OF THE PREFERRED EMBODIMENTS

FIG. 4 shows a CCM2 switching device with a space-division switching network RKF, with an STM-1 interface unit AE1, with a 140-Mbit/s interface unit AE2, with a 34-Mbit/s interface unit AE3, with a 2-Mbit/s interface unit AE4, with a section overhead server SOHS and with a network control unit NCU which is connected to all other units. The bit rates are rounded up or down.

Figure 1:
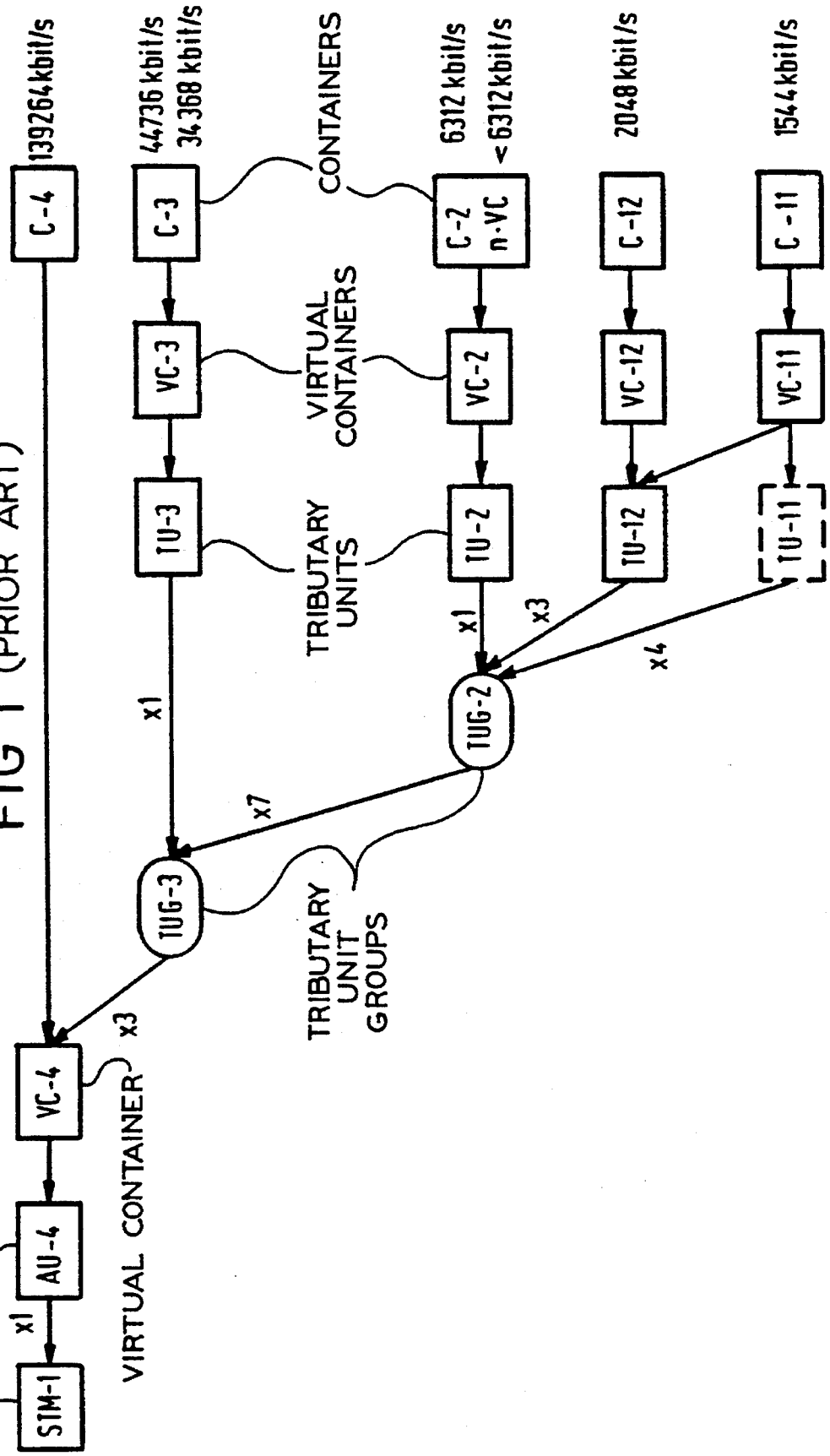
FIG. 1 shows a multiplexing concept.
Figure 2:
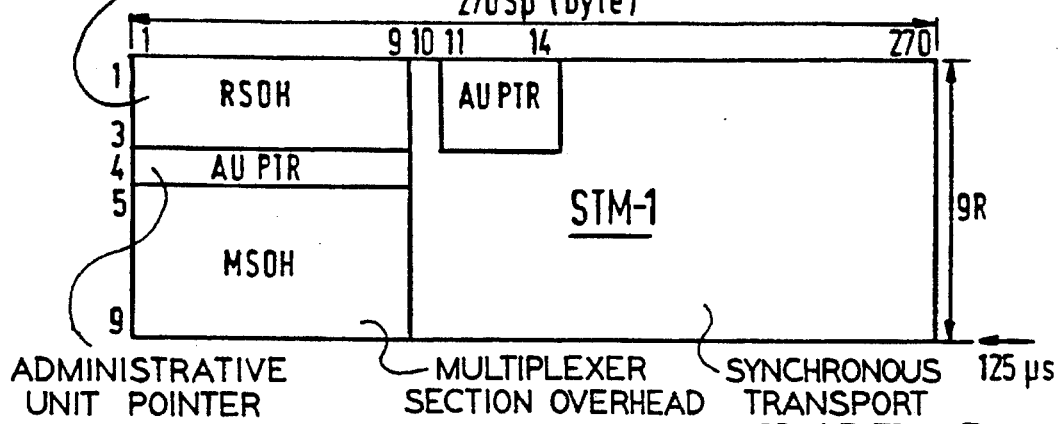
FIG. 2 shows a synchronous transport module STM-1.
Figure 3:
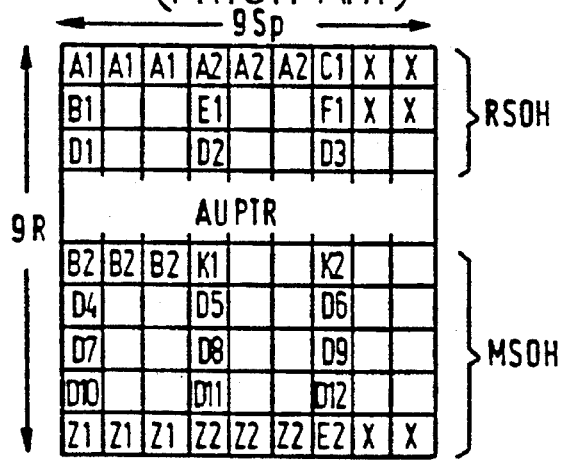
FIG. 3 shows a RSOH and MSOH section overhead.

In interface units AE1 to AE4, the necessary process steps according to FIG. 1 are shown. D means digital signal and ZKF means time-division switching network. In the latter, the information signals in the frame can be sorted with respect to time. Blocks with an oblique line are multiplexers or demultiplexers, respectively.

The interface units AE2 to AE4 are of no significance to the invention and will not be explained further. In the STM-1 interface unit AE1, the process steps can basically run in both directions. There are three variants as is also shown by the multiplexing structure in FIG. 1.

FIG. 5 shows on the left the known frame of a D39 signal in which a D2S signal which contains a tributary unit TU-12 is in each case transmitted in columns 1 to 15. FS designates stuffing bytes, KWA1 and KWA2 designate switching path addresses, QK designates quality criteria, RKW a frame alignment word and V1 to V4 path overheads.

An STM-1 signal is distributed to four D39 frames. According to the multiplexing structure in FIG. 1, sixty three columns are needed for this. The remaining sixty fourth column in the fourth D39 signal accommodates bytes C1, D1 to D12, E1 to E2, F1, K1, K2, Z1 and Z2 of the RSOH and MSOH section overhead as special column SSp.

This is shown in FIG. 5 in which the sixteenth column SSP has not received a D2S signal and contains in the top quarter those bytes which are extracted enlarged on the right.

To each received STM-1 signal, one such special column belongs, sixteen of which are in each case multiplexed to form a D39 signal in the space-division switching network RKF, which are supplied to the section overhead server SOHS and are evaluated by the NCU processor. For outgoing STM-1 signals, special columns are assembled in the section overhead server SOHS under control of the NCU processor and are in each case transmitted sixteen times in a D39 signal to the spaced-division switching network RKF.

Figure 6:
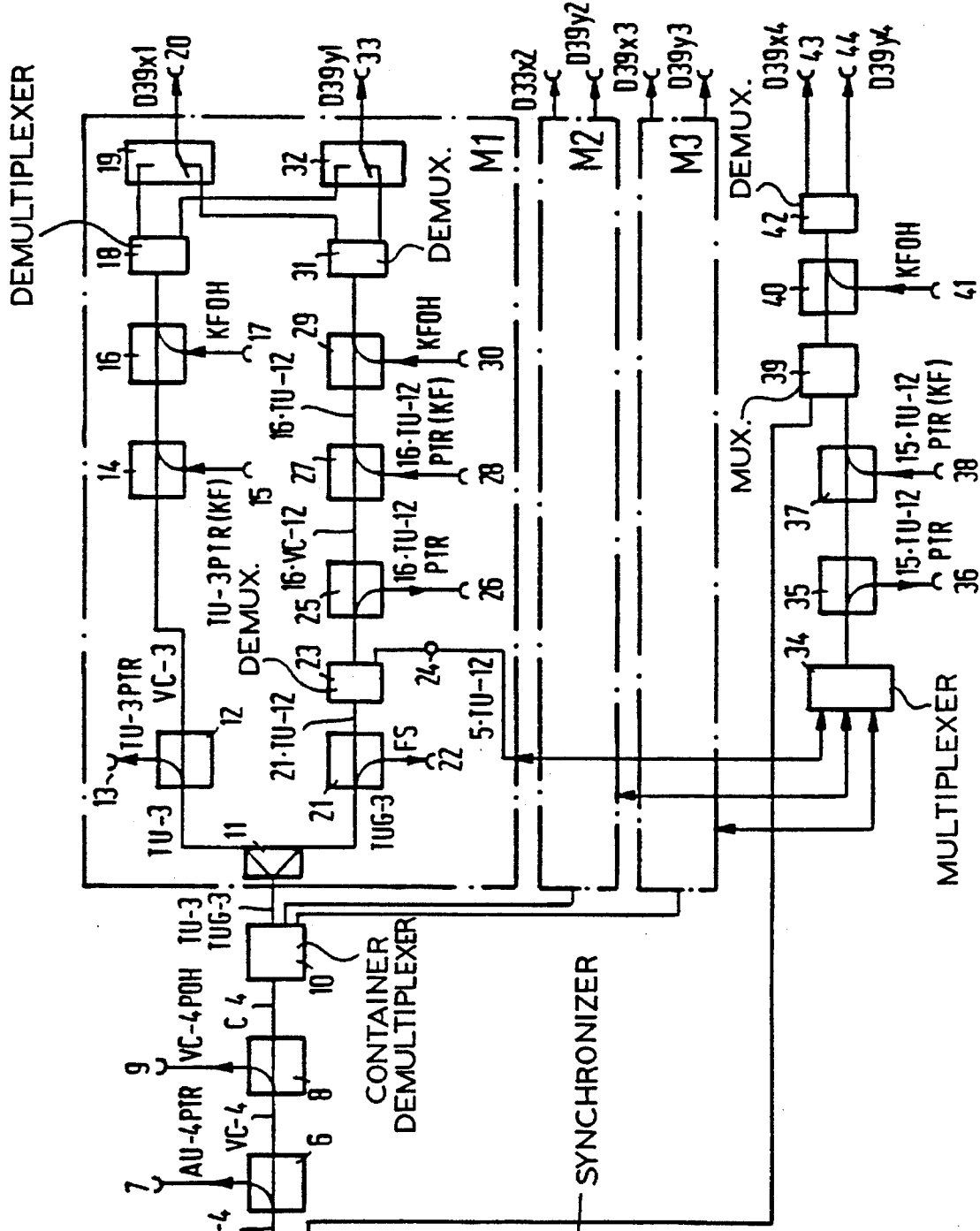
FIG. 6 shows a receiving section according to the invention of an STM-1 interface unit.
Figure 7:
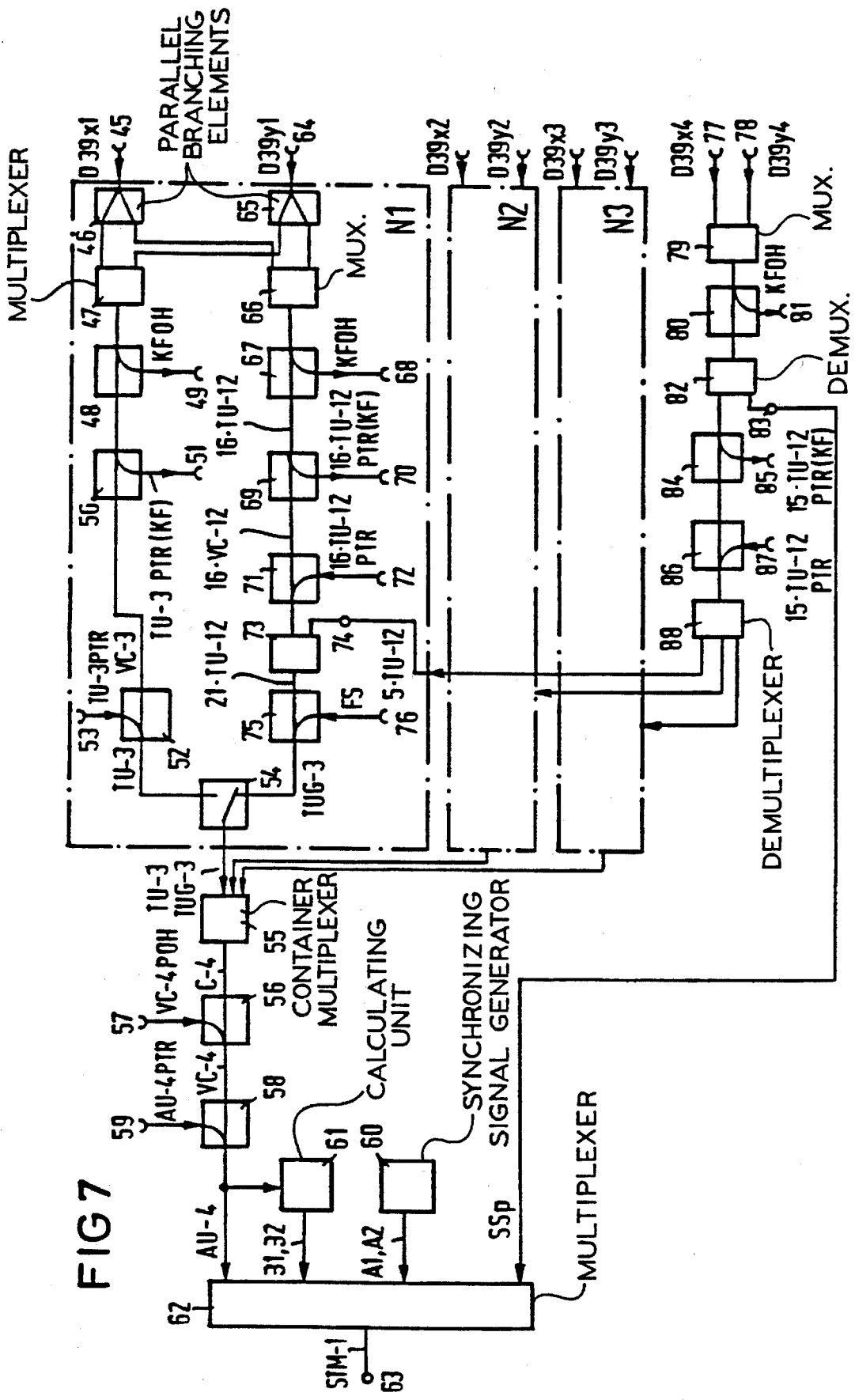
FIG. 7 shows a transmitting section according to the invention of an STM-1 interface unit.

FIG. 6 shows a receiving section and FIG. 7 shows a transmitting section of an interface Unit AE1, in which, in the multiplexing structure according to FIG. 1, on the one hand the path of STM-1 via TUG-3 to TU-3 and on the other hand the path of STM-1 via TUG-3 and TU-2 to TU-12 and the reverse is processed. An arrangement for the path to TU-11 only differs from this by one factor in the transmission.

The arrangement according to FIG. 6 contains an error rate analyzer 2, a synchronising device 3, a demultiplexer 4, an AU-4-PTR output coupler and analyzer 6, a VC-4-POH output coupler and analyzer 8, a container demultiplexer 10 with synchronizing device, a parallel branching element 11, a TU-3-PTR output coupler and analyzer 12, a TU-3-PTR (KF) input coupler 14, a KFOH inserter 16, a demultiplexer 18, a signal switch 19, an output coupler for fixed stuffing bytes 21, a demultiplexer 23, a 16(TU-12 PTR) output coupler and analyzer 25, a 16(TU-12 PTR(KF)) input coupling and synchronizing device 27, a KFOH inserter 29, a demultiplexer 31, a signal switch 32, a multiplexer 34, a 15(TU-12PTR) output coupler and analyzer 35, a 15(TU-12 PTR(KF)) input coupling and synchronizing device 37, a multiplexer 39, a KFOH inserter 40 and a demultiplexer 42.

The M1 assembly from the parallel branching element 11 to the D39x1signal output 20 and the D39y1 signal output 33 is present twice more as assemblies M2 and M3 connected to the container demultiplexer 10. For reasons of clarity, the buffer memories required for each clock adaptation are not shown here and in the next figure.

An STM-1 signal is applied to input 1. Bytes B1 and B2 from the multiplexer section overhead MSOH are supplied to the error rate analyzer 2. Bytes A1 and A2 from the regenerator section overhead RSOH are received by the synchronizing device 3. In the demultiplexer 4, the administrative unit AU-4 is separated from the regenerator and multiplexer section overhead RSOH and MSOH. The AU-4-PTR pointer is coupled out of the AU-4-PTR output coupler and analyzer 6 via an output 7 and is analyzed. The remaining VC-4 virtual container passes to the VC-4-POH output coupler and analyzer 8 which analyzes the VC-4-POH path overhead and outputs it via its output 9. The information on the container start and the super-frame status is signaled to the subsequent circuits 10, 12, 21, 23, 25, 27, 29 and 31. The C-4 container passes to the container demultiplexer 10 with synchronizing device. In the latter, it is split into three TU-3 tributary units, three TUG-3 tributary unit groups or a mixture of the two. The three parallel branching elements 11 in assemblies M1 to M3 are in each case supplied with either a TU-3 tributary unit or a TUG-3 tributary unit group.

In the TU-3-PTR output coupler and analyzer 12 in the first path and in the output coupler 21 for fixed stuffing bytes in the second path, it is investigated whether a TU-3-PTR pointer or fixed stuffing bytes FS are present. If a TU-3-PTR pointer is present, it is analyzed and output via an output 13. The information on the container start and the super-frame status is signaled to the subsequent circuits 14 and 16. If fixed stuffing bytes FS are present, they are output via an output 22.

At the output of the TU-3-PTR output coupler and analyzer 12, a VC-3 virtual container with its source clock may be available. This VC-3 virtual container is synchronized with the local switching network clock, extracted from the network node clock, in the TU-3-PTR(KF) input coupler 14 (KF=switching network), inserting a TU-3-PTR(KF) pointer, via an input 15 for the purpose of clock adaptation and is inserted into a switching network super frame at an input 17, together with the supplementary switching network information KFOH, in the KFOH inserter 16. In the demultiplexer 18, the D39 signal is divided time slot by time slot into a D39x1 and an identical D39y1 signal in order to prevent blocking in the space-division switching network RKF. If the D39x1 signal output 20 and the D39y1 signal output 33 are connected to the demultiplexer 18 via the signal switches 19 and 32, these signals are available and are supplied to the space-division switching network RKF in FIG. 4.

If, however, fixed stuffing bytes were detected in the output coupler 21 for fixed stuffing bytes, a TUG-3 tributary unit group would occur at its main output, which would consist of twenty one TU-12 tributary units. In the demultiplexer 23, five TU-12 tributary units would be branched off to an output 24 and sixteen would be forwarded. In the 16(TU-12-PTR) output coupler and analyzer 25, sixteen TU-12-PTR pointers would be analyzed and removed via an output 26. From the 16(TU-12-PTR) output coupler and analyzer 25, sixteen VC-12 virtual containers pass to the 16(TU-12-PTR(KF)) input coupling and synchronising device 27, where they would be synchronized to the local switching network clock with insertion of 16(TU-12PTR(KF)) pointers and embedded in the switching network super frame via an input 30, with the addition of the supplementary switching network information KFOH, in the KFOH inserter 29. The demultiplexer 31 would then work like the demultiplexer 18. The signal switches 19 and 31 would then have to connect the demultiplexer 31 to the D39x1 signal output 20 and the D39y1 signal output 33.

The supplementary switching network information inserter 29 expediently also contains a "router" function (time-division switching network ZKF) by means of which the time sequence of the sixteen VC-12 virtual containers can be varied.

From outputs 24 of the demultiplexers 23 of the assemblies M1 to M3, three times five TU-12 tributary units pass to the multiplexer 34. From the multiplexed fifteen TU-12 tributary units, fifteen TU-12-PTR pointers are taken in the 15(TU-12PTR) output coupler and analyzer 35 via an output 36. In the 15(TU-12PTR(KF)) input coupling and synchronizing device 37, fifteen (TU-12-PTR(KF)) pointers are added via an input 38. The output signal is multiplexed with the special column SSp issued from the demultiplexer 4 in the multiplexer 39. A supplementary switching network information KFOH is added to the demultiplexer output signal in the KFOH inserter 40 via an input 41. In the demultiplexer 42, the D39 signal produced is divided into a D39x4 at an output 43 and a D39y4 signal at an output 44 as in the demultiplexers 18 and 31.

If complete TU-3 tributary units are processed in all three assemblies M1 to M3, the D39x4 and the D39y4 signal overall only contains the special column SSp since there is sufficient space in the D39x1 to D39x3 signals and in the D39y1 to D39y3 signals.

The arrangement according to FIG. 7 contains a parallel branching element 46, a multiplexer 47, a KFOH output coupling device 48, a TU-3-PTR(KF) output coupler and analyzer 50, a TU-3-PTR input coupler 52, a signal switch 54, a container multiplexer 55, a VC-4-POH input coupler 56, an AU-4-PTR input coupler 58, a A1 and A2 synchronizing signal generator 60, a B1 and B2 calculating unit 61, a multiplexer 62, a parallel branching element 65, a multiplexer 66, a KFOH output coupling device 67, a 16(TU-12 PTR(KF)) output coupler and analyzer 69, a 16(TU-12 PTR) input coupler 71, an input coupler 75 for fixed stuffing bytes, a multiplexer 79, a KFOH output coupling device 80, a demultiplexer 82, a 15(TU-12 PTR(KF)) output coupler and analyzer 84, a 15(TU-12PTR) input coupler 86 and a demultiplexer 88.

The multiplexing process proceeds in the reverse order to the demultiplexing process according to FIG. 6. First, the D39x1 and the D39y1 signal are supplied to the multiplexers 47 and 66 via the parallel branching elements 46 and 65. Then the supplementary switching network information KFOH is coupled out in the KFOH output coupling device 48, is analyzed and output via an output 49. In the TU-3-PTR(KF) output coupler and analyzer 50, the TU-3-PTR(KF) pointer is analyzed and output via an output 51. A TU-3-PTR pointer is added to the remaining VC-3 virtual container in the TU-3-PTR input coupler 52 via the input 53. During this process, no clock adaptation by means of stuffing is required, however, since all D39 signals have already been synchronized with the network node clock before reaching the space-division switching network RKF.

The supplementary switching network information KFOH is analyzed in the KFOH output coupling device 67 and output via an output 68. The remaining sixteen TU-12 tributary units pass to the 16(TU-12PTR(KF)) output coupler and analyzer 69, where the sixteen TU-12-PTR(KF) pointers are analyzed and branched off via an output 70. Here, too, no clock adaptation by means of stuffing is required since all D39 signals have already been synchronized to the network node clock before reaching the space-division switching network RKF.

Sixteen TU-12-PTR pointers are supplied to the remaining sixteen VC-12 virtual containers in the 16(TU-12 PTR) input coupler 71 via an input 72. In the multiplexer 73, a further five TU-12 tributary units are multiplexed via an input 74. Fixed stuffing bytes FS are added into the output TUG-3 tributary unit group via an input 76 in the input coupler 75 for fixed stuffing bytes.

The position of the signal switch 54 depends on the signal content of the D39 signal or is determined by a network management. In the container multiplexer 55, three TU-3 tributary units and/or TUG-3 tributary unit groups are multiplexed byte by byte. In the VC-4-POH input coupler 56, a VC-4-POH path overhead is added to the C-4 container via an input 57. An AU-4-PTR pointer is assigned to the VC-4 virtual container thus formed, via an input 59 in the AU-4-

PTR input coupler 58, so that an AU-4 administrative unit can be output at the output of the AU-4-PTR input coupler 58. In the multiplexer 62, bytes A1 and A2 from the A1 and A2 synchronizing signal generator 60 and bytes B1 and B2 from the B1 and B2 calculating unit 61 are also added so that an STM-1 signal can be output at an output 63.

Here, too, routing functions can be introduced.

The D39x4 and the D39y4 signal are multiplexed in the multiplexer 79. In the KFOH output coupling device 80, the supplementary network information KFOH is taken out via an input 81. In the demultiplexer 82, the special column SSp is separated and output via. an output 83. Fifteen TU-12-PTR(KF) pointers are taken out in the 15(TU-12-PTR(KF)) output coupler and analyzer 84. Fifteen TU-12-PTR pointers are added in the 15(TU-12-PTR) input coupler 86. In the demultiplexer 88, the fifteen TU-12 tributary units are distributed to the inputs 74 of the multiplexer 73 of the three assemblies N1 to N3.

Figure 8:
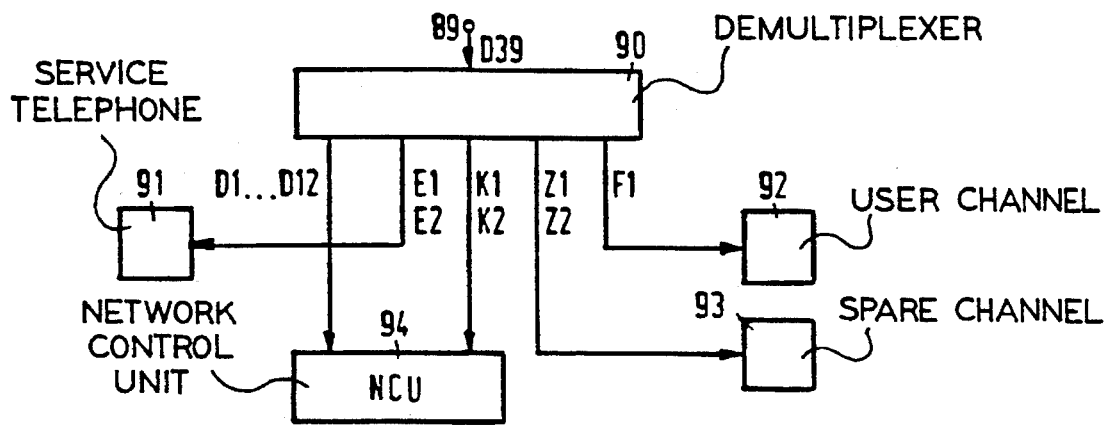
FIG. 8 shows a section overhead server according to the invention.

FIG. 8 shows a receiving section for a D39 signal in a section overhead server SOHS. The arrangement contains a demultiplexer 90, a service telephone 91, a user channel 92, a spare channel 93 and a network control unit 94.

In the demultiplexer 90, a D39 signal with sixteen special columns, the bytes of which are successively distributed, is supplied via the input 89. The network control unit 94 is supplied with bytes D1 to D12, K1 and K2, the service telephone 91 is supplied with bytes E1 and E2, the user channel 92 with byte F1 and the spare channel 93 with bytes Z1 and Z2. These method steps occur in the reverse order in a transmitting section of the section overhead server SOHS.

Although other modifications and changes may be suggested by those skilled in the art, it is the intention of the inventor to embody within the patent warranted hereon all changes and modificationos as reasonably and properly come within the scope of his contribution to the art.

I claim:

1. A method for receiving section overheads from all incoming synchronous transfer module signals and for outputing section overheads to all outgoing synchronous transfer module signals in a switching device having a section overhead server connected to a space-division switching network with synchronous transfer module interface units and to a processor in a network node of a digital information transmission system, the method comprising the steps of:

in a receiving section of each synchronous transfer module interface unit, converting an synchronous transfer module signal into four D39 signals each having one byte frame of 152 rows and 16 columns, inserting overhead bytes for special purposes of section overheads, with the exception of frame synchronization bytes and bytes for determining bit error rate from each section overhead, into a special. column of said byte frame of one of said four D39 signals, supplying only bytes of said special column to the section overhead server via the space-division switching network for each incoming synchronous transfer module signal, evaluating the bytes of said special column in the section overhead server and generating are outgoing special column of new overhead bytes for said special column for each outgoing synchronous transfer module signal;

inserting said outgoing special column instead of said special column into one of said four D39 signals supplied to a transmitting section of said synchronous transfer module interface unit via said space-division switching network, and converting said four D39 signals into said each outgoing synchronous transfer module signal.

2. A method for cross-connecting synchronous transfer module signals in a network node of a digital transmission system, the network node having a space-division switching network connected to synchronous transfer module interface units and to a section overhead server, and having a processor connected to the section overhead server and to the synchronous transfer module interface units, the method comprising the steps of:

converting in a receiving section of each of said synchronous transfer module interface units a received one of said synchronous transfer module signals having a section overhead into four D39 signals, each of said D39 signals having a byte frame of 152 rows and 16 columns;

inserting overhead bytes of the section overhead except frame synchronization bytes and bytes for determining a bit error rate into an unoccupied special column of one of said D39 signals;

supplying overhead bytes only of said special column to the section overhead server via the space-division switching network for each said received synchronous transfer module signal;

generating overhead bytes except said frame synchronization bytes and said bytes for determining the bit error rate in the section overhead server for each outgoing one of said synchronous transfer module signals;

cross-connecting said four D39 signals via the spaced-division switching network to a transmitting section of one of said synchronous transfer module interface units;

inserting the overhead bytes generated in said step of generating into the special column of one of said four D39 signals; and converting said four D39 signals into an outgoing synchronous transfer module signal.

\* \* \* \* \*